United States Patent [19]

Ueno et al.

[11] Patent Number: 4,555,324
[45] Date of Patent: Nov. 26, 1985

[54] POROUS GAS DIFFUSION ELECTRODE AND METHOD OF PRODUCING THE SAME

[75] Inventors: Mitsushi Ueno, Yokohama; Tamotsu Shirogami, Yamato; Yukihiro Mikogami, Yokohama, all of Japan

[73] Assignee: Kabushiki Kaisha Toshiba, Kawasaki, Japan

[21] Appl. No.: 607,786

[22] Filed: May 7, 1984

[30] Foreign Application Priority Data

May 9, 1983 [JP] Japan ............................ 58-80553
Oct. 25, 1983 [JP] Japan ............................ 58-198313

[51] Int. Cl.$^4$ .................. C25B 11/03; C25B 11/04; B05D 5/12; H01M 2/08
[52] U.S. Cl. ............................. 204/284; 204/290 R; 427/58; 429/36
[58] Field of Search .............. 204/284, 279, 290 R, 204/265, 277, 256, 258; 427/58; 264/272.21, 261; 429/35, 38, 36

[56] References Cited

U.S. PATENT DOCUMENTS

| | | | |
|---|---|---|---|
| 4,045,325 | 8/1977 | Schwickart et al. | 204/256 X |
| 4,159,367 | 6/1979 | Berchielli et al. | 429/38 |
| 4,279,970 | 7/1981 | Breault et al. | 429/35 |
| 4,386,987 | 6/1983 | Covitch et al. | 204/290 R |
| 4,435,267 | 3/1984 | Batzold et al. | 204/284 |

FOREIGN PATENT DOCUMENTS 1100600 6/1968 United Kingdom ................ 429/35

Primary Examiner—Donald R. Valentine
Attorney, Agent, or Firm—Schwartz, Jeffery, Schwaab, Mack, Blumenthal & Evans

[57] ABSTRACT

A porous gas diffusion electrode for use in an air-metal cell or a hydrogen-air (oxygen) cell comprising an electroconductive porous substrate, which has itself on one surface thereof reaction gas feed channels or is to be used with one surface in contact with reaction gas feed channels during use, and which comprises gas impermeable and electrically insulating seals formed of a tetrafluoroethylene-perfluoroalkyl vinyl ether compolymer provided on the substrate at least at both end portions parallel to said reaction gas feed channels, is capable of positively shielding the gas streams at the end portions parallel to the reaction gas feed channels and maintaining electrical insulation.

Such a porous gas diffusion electrode can be prepared by a method comprising applying a tetrafluoroethylene-perfluoroalkyl vinyl ether copolymer on the substrate at least at the end portions parallel to the reaction gas feed channels and then subjecting the substrate coated with the copolymer to hot pressure bonding by means of a pressure bonding tool made of a metal previously coated with a fluoride oil to form gas impermeable and electrically insulating seals comprising said copolymer.

14 Claims, 5 Drawing Figures

POROUS GAS DIFFUSION ELECTRODE AND METHOD OF PRODUCING THE SAME

BACKGROUND OF THE INVENTION

1. Technical Field of the Invention

This invention relates to a porous gas diffusion electrode and a method of preparing the same and more particularly to a porous gas diffusion electrode provided with end portion seals constituting an electricity generating element which can be used for air-metal cells and fuel cells, be easily laminated, and used with high reliability and also to a method of producing the same.

2. Technical Background of the Invention and its Problems

Air-metal type cells or hydrogen-air (oxygen) fuel cells are required to have electrodes for ionization of gas as their electromotive mechanisms. The gas diffusion electrode, in which a gas having no electroconductivity participates continuously in electromotive reaction, employs a porous plate substrate and is so constituted that one surface of the substrate is brought into contact with an electrolyte, and the gas flowing into the substrate from the other surface is permitted to participate in the electromotive reaction within the substrate. In general, for feeding a reaction gas, reaction gas feed channels are provided on the substrate itself, or the substrate is used so as to be contacted with another element having reaction gas feed channels.

In these cell systems, each unit cell outputs a voltage of at most 0.5 to 1.5 V, and hence a considerable number of unit cells are required to be laminated and provided for practical use. During lamination, unit cells are laminated in such a manner that the reaction gas feed channels provided on one substrate itself or provided in contact with the substrate during use under lamination are in a direction to cross over other gas feed channels provided above or below. Accordingly, it is necessary to treat the end portions on the side faces parallel to the respective gas feed channels so that one reaction gas, for example, hydrogen gas, flowing through one reaction gas channel and another gas, for example, air, flowing through another gas feed channel above or under said channel will not become mixed with each other. At the same time, it is also necessary to treat the end portions so as to maintain electrical insulation even when compressed mechanically strongly by lamination of a large number of units.

In order to prevent mixing of different gases at the end portions of the substrate parallel to gas feed channels and to ensure electrical insulation at the end portions, a method in which the end portions are coated with synthetic resins and a method in which they are impregnated with a dispersion of a tetrafluoroethylene copolymer have been proposed. However, none of these methods has been successful in obtaining satisfactory results.

SUMMARY OF THE INVENTION

Accordingly, an object of the present invention is to provide a porous gas diffusion electrode for use in an air-metal cell or a hydrogen-air (oxygen) cell comprising an electroconductive porous substrate, which has itself on one surface thereof reaction gas feed channels or is to be used with one surface in contact with reaction gas feed channels during usage, the electrode being capable of positively shielding the gas streams at the end portions parallel to the reaction gas feed channels and maintaining electrical insulation. Another object of the invention is to provide a method of preparing such an electrode.

In accordance of the present invention, there is provided a porous gas diffusion electrode comprising an electroconductive porous substrate, which has itself on one surface thereof reaction gas feed channels or is to be used with one surface in contact with reaction gas feed channels during use, and which comprises gas impermeable and electrically insulating seals formed of a tetrafluoroethylene-perfluoroalkyl vinyl ether copolymer (hereinafter sometimes referred to as PFA copolymer) provided on the substrate at least at both end portions parallel to said reaction gas feed channels.

The present invention also provides a method of preparing such a porous gas diffusion electrode, which method comprises applying a tetrafluoroethylene-perfluoroalkyl vinyl ether copolymer on the substrate at least at the end portions parallel to the reaction gas feed channels and then subjecting the substrate coated with the copolymer to hot pressure bonding by means of a pressure bonding tool made of a metal previously coated with a fluoride oil to form gas impermeable and electrically insulating seals comprising said copolymer.

BRIEF DESCRIPTION OF THE DRAWINGS

FIGS. 2 through 4 are schematic perspective views respectively of the states under hot pressure bonding in a mold cavity according to the method of the present invention, wherein FIG. 2 shows the case of use of powdery or granular copolymer, FIG. 3 the case of use of film copolymer, and FIG. 4 the case of use of powdery or granular copolymer and film copolymer.

DETAILED DESCRIPTION OF THE INVENTION

Figure 1:
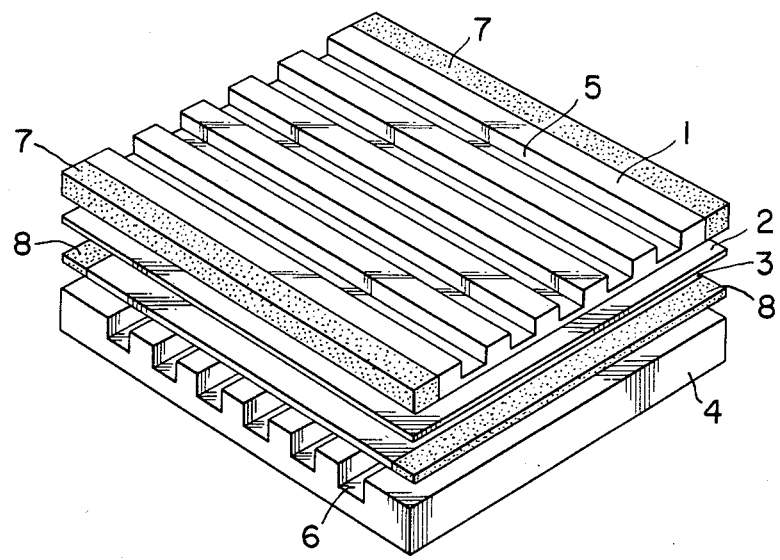
FIG. 1 is a perspective view of an electricity generating element including a porous gas diffusion electrode having formed seals at the end portions according to the present invention.

In an embodiment of the present invention as shown in FIG. 1, the electric power generating element comprises, in order from above, an electrode 1 provided with reaction gas feed channels 5, an electrolyte layer 2, a thin electrode 3 and a laminated element 4 provided with reaction gas feed channels 6. The several reaction gas feed channels 5 provided in the electrode 1, and the reaction gas feed channels 6 provided in the laminated element 4 are perpendicular to each other.

For both of the electrodes 1 and 3, porous substrates with a porosity of 60 to 70% which are plate shaped and are electron conductive are used. For example, porous plates prepared by forming sintered nickel or graphite fibers into paper and then heat treating the same can be used. The latter is suitable in a fuel cell in which a concentrated acid liquid such as concentrated phosphoric acid is used as the electrolyte.

In the present invention, at the end portions of such electrodes 1 and 3, gas impermeable, electrically insulating seals are provided. As shown in FIG. 1, in the electrode 1 provided with the reaction gas feed channels 5, these seals are provided at the end portions 7, 7 in parallel to the reaction gas feed channels, while in the thin electrode 3, they are provided at the end portions 8, 8 in parallel to the reaction gas feed channels 6 provided in the laminated element 4 in contact with the thin electrode upon lamination. In the thin electrode 3, it is also possible to provide seals at other portions such as the end portions crossing over the channels 6, but it is necessary to provide the seals at least at the end portions 8, 8 in parallel to the channels 6.

For formation of the aforesaid seal, it is necessary to use a material which is capable of sealing the fine pores in the end portions to prevent passage or leak of reaction gases therethrough and also maintain electrical insulation in spite of the mechanical pressure during lamination, and which has excellent chemical resistance so as to withstand high temperature actions with the use of a concentrated acidic electrolyte and is thermally stable at temperatures in excess of 250° C., even at a temperature of 350° C. for a short period of time. The material must also be heat-sealable. As such a material, a tetrafluoroethyl-perfluoroalkylvinylether copolymer is used. Tetrafluoroethylene has the molecular formula of $CF_2=CF_2$, as is well known in the art. Perfluoroalkyl vinyl ether has the formula of $CH_2=CHOR$, wherein R represents a perfluoroalkyl group having ordinarily 2 to 4, preferably 3, carbon atoms, of which the hydrogen atoms on the alkyl group are all substituted with fluorine atoms. The content of tetrafluoroethylene in this copolymer are within the range of from about 96 to 97% by weight.

This copolymer is commercially available in the form of powder, granules, film and emulsion. These forms can be used either singly or in any desired combination. For example, the above copolymers in the form of powder or granules can be dispersed on the surface at the end portions and then subjected to pressurization into the porous substrate by application of heat and pressure, or a film of the above copolymer can be spread all over the end portions, namely in U-shape, and then subjected to application of heat and pressure thereon to cause the film to closely contact the porous substrate ends, thereby forming seals.

It is also possible to disperse the above copolymer in the form of powder or granules on the surfaces of the end portions, then cover the surfaces with a film of the above copolymer, and apply heat and pressure to the film to form seals. Alternatively, the surfaces of the end portions can be coated with the copolymer in state of emulsion, and then heat and pressure applied thereto, or further a film of the copolymer can be placed thereon, which step is followed by a similar application of heat and pressure to form seals.

The method of forming the end portion seals on such porous gas diffusion electrodes 1 and 3 will now be described in greater detail. The above mentioned copolymer in the form of powder or granules is mixed with a suitable solvent such as one of fluoride type and stirred at room temperature to 40° C. to prepare a mixed agent. This mixed agent is applied on the surfaces of the end portions of the porous substrate constituting the electrode and dried in air to cause the powdery or granular copolymer to be dispersed evenly throughout the surfaces of the end portions. Its amount is such that there will be a rise of the sealant of about 0.1 to 0.3 mm after hot pressure bonding and air drying. Then, the substrate is placed within a female mold of a pressure bonding tool made of a metal, such as a mold cavity coated previously with a mold releasing agent comprising a fluoride oil, and a male mold is placed against the surfaces of the end portions having the above copolymer dispersed therein. Then pressure bonding is carried out while heating the whole assembly to a temperature not higher than 380° C., preferably 340° to 350° C. under pressurization of about 20 to 40 kg/cm$^2$ in terms of planar pressure.

As the fluoride oil, commercially available fluoride wax may be used as it is, or this may be further mixed with a fluoride solvent under stirring before use. What is important here is that at least the necessary portions on the surface of the pressure bonding tool, namely, the portions to be contacted by the portions on which the above copolymer is dispersed or deposited, should previously be coated with a fluoride oil as a mold releasing agent. It is also important to control the temperature to a value not higher than 380° C. Since the above copolymer has good heat-sealable property with respect to a metal, mold release can be easily carried out with the use of a fluoride oil as the mold releasing agent. On the other hand, the above powdery or granular copolymer will begin to generate bubbles at a temperature in excess of 380° C., whereby uniform formation of seals is rendered impossible. In practice, heating is carried out at a temperature of 340°-380° C. under the planar pressure mentioned above for 15 to 30 minutes, and then annealing is conducted at 80° to 90° C. for about one hour, followed by removal of the sealed product from the mold.

Figure 2:
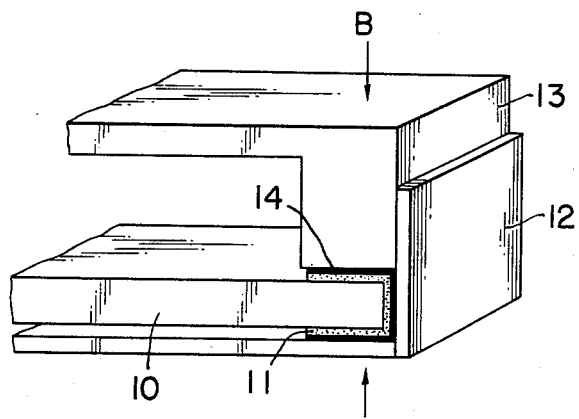

This method is indicated in FIG. 2, in which a powdery of granular copolymer 11 is dispersed on the surfaces of a porous substrate 10 for formation of an electrode, at the end portion thereof. On the other hand, the mold is previously coated with a mold releasing agent 14 comprising a fluoride oil at the corner portion of a female mold 12 and the pressure bonded face of a male mold 13, namely at the sites to be contacted with the surface where the above copolymer is dispersed. As illustrated in the drawing, the porous substrate 10, on which the above copolymer 11 is dispersed in an amount such that it will be raised to about 0.1 to 0.3 mm after air drying, is placed within the female mold 12 previously coated with the fluoride oil mold releasing agent 14, and then hot pressure bonding is carried out by means of the male mold similarly coated with the mold releasing agent 14 by pressurization from upward and downward directions A and B.

Figure 3:
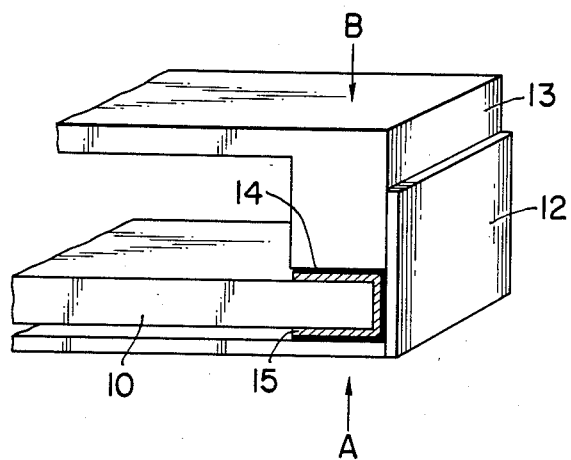

In the case where the above copolymer is used in the form of a film, formation of the seal is possible in substantially the same manner. More specifically, as shown in FIG. 3, the above copolymer 15 in the form of a film with a thickness of about 0.1 to 0.2 mm is placed as a cover on the surface of the end portion of the porous substrate 10 with a U-shaped, cross-section, and the covered substrate is placed within the female mold 12 coated previously with a fluoride oil mold releasing agent 14, after which hot pressure bonding is carried out by pressurization from both upward and downward directions. Also, in this case, the heating temperature must not exceed 380° C., and a good seal portion can be formed in practice by heating to 340° to 380° C. under pressurization of a planar pressure of about 20 to 40 kg/cm$^2$ for 15 to 30 minutes and then performing annealing at a temperature of 80°-90° C. for about one hour, thereby pressurizing the above copolymer into the porous substrate.

Figure 4:
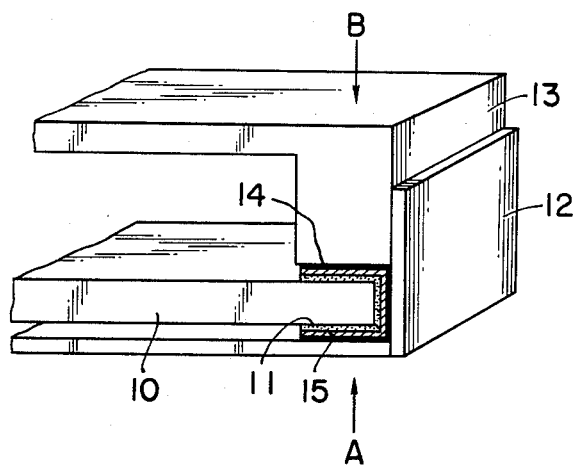

Referring now to FIG. 4, here the powdery or granular copolymer 11 is dispersed first similarly as described above on the surface of the end portions of the porous substrate 10, and further the copolymer 15 in form of a film with a thickness as specified above is placed thereover as a cover before placement of the substrate within a female mold 12 coated previously at the necessary portion with a fluoride oil 14. Then hot pressure bonding is carried out under the same pressure and temperature conditions as described above. It is also possible to disperse first the powdery or granular polymer, which is then subjected to hot pressure bonding to be pressurized into the porous substrate, and then to place a film copolymer as a cover over the substrate and carry out hot pressure bonding again.

In addition, a copolymer in the state of an emulsion can be applied on the surface of a porous substrate and dried, after which it is subjected to hot pressure bonding in a mold to be pressurized into the porous substrate. Alternatively, as described above, after coating and drying, a film copolymer can be placed as a cover over the substrate, and thereafter hot pressure bonding can be carried out. Such a copolymer in the state of an emulsion can be prepared by, for example, adding 100 parts by weight of water and 1 to 5 parts by weight of a nonionic surfactant to 20 to 60 parts by weight of the powdery or granular copolymer and vigorously stirring the mixture.

As described above, PFA copolymer is commercially available in various forms such as powder, granules, film, emulsion, etc., and can be used in any desired form. When PFA copolymer in the form of a film is employed, the copolymer can be previously formed in the shape of the letter U in cross-section so as to correspond to the shape of the aforesaid end portion, and the formed film is placed over the entire end portion, which step is followed by application of heat and pressure to obtain close contact of the film against the end portions of the porous substrate to form seals. By this process, improvement of yield can be brought about.

Alternatively, it is also possible to form seals by dispersing or applying the aforesaid copolymer in the form of powder, granules or emulsion on the surface of the end portions before placing the above copolymer molded in a film thereover, and then applying heat and pressure to the film.

More specifically, the above copolymer in the form of a flat film is relatively hard, and therefore it is not easily placed over the end portion. Accordingly, the film employed is previously heated to 200° to 230° C. and molded by means of a working tool into a U-shape in cross-section corresponding to the end portion. PFA copolymer in the form of a molded film is placed as a cover over the end portion of a porous substrate. The covered substrate is then placed in a female mold of a pressure bonding tool of a metal such as a mold cavity made of aluminum or an aluminum alloy having a smooth surface coated previously with a mold releasing agent comprising a fluoride oil, and a male mold coated similarly on the surface of the end portion with a mold releasing agent is pressed against the covered substrate. Finally, this step is followed by heating under pressurization at a temperature within the range of from 340° to 350° C. for 15 to 30 minutes to accomplish hot pressure bonding.

As the fluoride oil, commercially available fluoride wax may be used as it is, or a mixture of such a wax can be further mixed with a fluoride solvent under stirring before use. What is important here is to employ a working tool having a smooth surface made of aluminum or an aluminum alloy, in view of the fact that the above copolymer, while having a generally good heat-seal property with respect to metals, was found by experiment to be difficult to attach by melting to aluminum or an aluminum alloy. It is also important to coat previously the necessary portion of the working tool, namely, the portion contacted by the covered portion of the above copolymer, with a mold releasing agent. It is also important not to elevate the temperature above 380° C. The working tool for pressure bonding made of aluminum or an aluminum alloy is not limited to those made wholly of aluminum metal or aluminum alloy, but it is also possible to use favorably one which is coated on the surface corresponding to the bonded portion with a foil of aluminum metal or an aluminum alloy.

Further, in the present invention, after formation of the hot pressure bonded portion of PFA copolymer at the end portion of a porous substrate, a substance that is wettable with an electrolyte and is thermally and chemically stable with respect to an electrolyte can be provided by hot pressure bonding to form a gas impermeable and electrically insulating seal formed of PFA copolymer and the aforesaid substance at the end portion, whereby it is possible to obtain an electrode which is wettable with an electrolyte between the electrodes, is capable of retaining an ample amount of the electrolyte in the electrolyte layer and further has an end portion seal with reliability. Examples of the substance used here are silicon carbide, titanium carbide, tantalum carbide, tungsten carbide, zirconium oxide, tantalum oxide, and carbon powder. These may be used either singly or as any combination thereof. Any of these substances exhibits good wettability with respect to an electrolyte and is chemically stable without being corroded by the electrolyte. Each is also stable at high temperatures of about 200° C. or higher at which the fuel cell employing the electrolyte operates. This substance is ordinarily employed in the form of powder or granules.

The place where this substance is pressure bonded under heating may be the whole fused portion of PFA copolymer formed in the shape of U in cross-section on the end portion of the substrate as described above, but the substance is applied by hot pressure bonding on the fused portion of PFA copolymer at least on the side opposite to the surface having the aforesaid reaction gas feed channels or opposite to the face to be in contact with the reaction gas feed channels when used under lamination.

Figure 5:
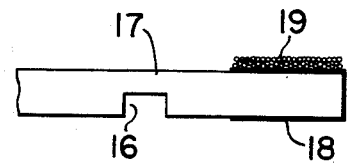
FIG. 5 is a schematic illustration of the state under hot pressure bonding of a substance wettable with an electrolyte and stable thermally and chemically with respect to the electrolyte, which is further applied on the fused portion of PFA copolymer.

In practicing hot pressure bonding of such a substance, as shown in FIG. 5, on the surface of the fused portion 18 formed at the end portion of the porous substrate 17 having reaction gas feed channels on one surface, at least on the face opposite to the face having the reaction gas feed channels 16, a substance 19 wettable with an electrolyte and thermally and chemically stable with respect to the electrolyte is dispersed densely to a thickness of about 0.05 to 0.3 mm, which is then subjected to hot pressure bonding by means of a hot pressure bonding tool made of a metal such as aluminum as shown in FIG. 2 while being heated to a temperature of 300° to 370° C. under a planar pressure similarly as described above.

The substance wettable with an electrolyte and thermally and chemically stable with respect to the electrolyte as mentioned above may be used solely, but it can be also used in the form of a mixture with the above PFA copolymer or in the form of a paste-like mixture prepared by mixing the three components of the substance, the above PFA copolymer and a fluoride type dispersing medium. The proportions are preferably 3 to 40 parts by weight of PFA copolymer powder per 100 parts by weight of the above substance in the former case, while the proportions are preferably 3 to 40 parts by weight of PFA copolymer powder and 150 to 600 parts by weight of a fluoride type dispersing medium per 100 parts by weight of the above substance in the latter case. The conditions during hot pressure bonding such as the temperature are substantially the same as in the case where the above substance along is used.

Thus, the porous gas diffusion electrode obtained according to the present invention by forming gas impermeable, electrically insulating seals comprising a tetrafluoroethylene-perfluoroalkyl vinyl ether copolymer at least at both end portions parallel to the reaction gas feed channels of a porous substrate not only can prevent completely leakage of reaction gas from the end portions but also will not be broken under strong pressure during lamination of electricity generating elements such as these electrodes due to its mechanical reinforcement, having also good electrical insulating property for complete prevention of semishort circuiting at the end portions frequently occurring in the past. Also, since lamination of electricity generating elements has been simplified, the time needed for laminating assembly thereof can be shortened to a great extent and high reliability of the laminated product can be maintained. In this connection, when electricity generating elements were formed by the use of a porous substrate subjected to treatment of the end portions with a polytetrafluoroethylene suspension, the yield was only about 2/5 as compared with the case in which the electrode of the present invention was employed, and lamination was also difficult. Thus, the present invention has also additional merits such as improvement of yield to a great extent.

If the above copolymer in the form of a flat film which is not contourable along the shape of the end portion is employed, it cannot be set well in position in the shape of the end portion, for example, a U-shaped cross-section, whereby the yield after hot pressure bonding will become only 50 to 60%. By permitting the above copolymer film to substantially coincide in shape with the end portion, for example, molding the film to have a U-shaped cross-section, and carrying out hot pressure bonding with the molded film covering the end portion, the yield can be improved to 80 to 90%. Further, by making the surface of the working tool for hot pressure bonding of smooth aluminum or aluminum alloy, no melt adhesion of the copolymer to the mold cavity will occur, whereby a yield close to 100% can be attained.

Also, by further applying a substance wettable with an electrolyte and thermally, chemically stable with respect to the electrolyte by hot pressure bonding on the surface of the fused portion obtained by hot pressure bonding of PFA copolymer at both end portions parallel to the reaction gas feed channels on a porous plate substrate, at least on the surface of the fused portion on the side opposite to the face having the reaction gas feed channels or on the side opposite to the face to be contacted with the reaction gas feed channels when laminated, the aforesaid surface can exhibit wettability with an electrolyte such as phosphoric acid, whereby a sufficient amount of electrolyte can be held in the electrolyte layer between electrodes, and the leak of reaction gas can be prevented. The above substance, and the fused portion will not be peeled off, and of course the seal can withstand the strong pressure during lamination without incurring breakage thereof to maintain its good electrical insulation, thus providing a porous electrode having end portion seals which are reliable.

EXAMPLE 1

A mixture of 192 g of a tetrafluoroethylene-perfluoroalkyl vinyl ether copolymer (Teflon MP-20, trade name, produced by Mitsui Fluorochemical Co., Ltd.) and 128 g of a fluoride type solvent (Fluorad FC 721, trade name, Sumitomo 3M Co., Ltd.) was stirred at room temperature for 30 minutes to prepare a mixed agent for coating.

Then, a porous plate substrate made of thin graphite fibers comprising a carbon paper with a size of 700 mm×700 mm and a thickness of 0.5 mm (E-715, trade name, produced by Kureha Kagaku Co., Ltd.) was coated at both end portions with the above mixed agent to widths each of 20 mm and left to stand for air drying to cause the above copolymer to be dispersed at said end portions.

Separately, a mold as shown in the drawings was previously coated at the necessary portions with a fluorine wax (Difloil #100, trade name, produced by Osaka Kinzoku Kogyo Co., Ltd.), and the porous substrate as prepared above was placed within the mold, and heated to a temperature of 340° to 370° C. under a load of a planar pressure of 20 kg/cm$^2$ for about 15 minutes, after which annealing was carried out at 80° to 90° C. for about one hour. When the mold was removed, and the product was left to stand for air drying, the above copolymer was found to be pressurized into the substrate and attached with a rise of about 0.1 mm.

The sealed portion thus formed was uniform at the end face without any leakage of gas whatsoever, was mechanically strengthened after lamination, and had good electrical insulating property.

EXAMPLE 2

A mixture of 192 g of a tetrafluoroethylene-perfluoroalkyl vinyl ether copolymer (Teflon MP-10, trade name, produced by Mitsui Fluorochemical Co., Ltd.) and 128 g of a fluoride type solvent (Diflon Solvent S3, trade name, produced by Osaka Kinzoku Kogyo Co., Ltd.) was stirred under heating at 45° to 50° C. for 30 minutes to prepare a mixed agent for coating.

Then, by using as the substrate a carbon paper with a size of 700 mm×700 mm and a thickness of 2 mm (E-750, trade name, produced by Kureha Kagaku Co., Ltd.) prepared by sheet-making of graphite fibers, the substrate was coated at both end portions with the above mixed agent to widths each of 20 mm and left to stand for air drying to cause the above copolymer to be dispersed at the end portions.

Separately, with the use of a mold releasing agent prepared by homogenization of a mixture of 120 g of a fluoride wax (Difloil #100, trade name, produced by Osaka Kinzoku Kogyo Co., Ltd.) and 180 g of a fluoride solvent (Freon 113, trade name, produced by Mitsui Fluorochemical Co., Ltd.) by stirring at 45° to 50° C. for 30 minutes, a mold was coated at necessary portions with the mold releasing agent. The above porous substrate was placed in the mold and subjected to hot pressure bonding similarly as described in Example 1. The above copolymer was found to be pressurized into the substrate and attached after air drying with a rise of about 0.3 mm on the surface. A sealed portion with excellent gas impermeability and electrical insulation was formed, whereby leakage of gas could be completely prevented.

EXAMPLE 3

A porous plate substrate of thin graphite fibers comprising a carbon paper with a size of 700 mm×700 mm and a thickness of 0.5 mm (E-715, trade name, produced by Kureha Kagaku Kogyo Co., Ltd.) was coated at the end portions with a film of a tetrafluoroethylene-perfluoroalkyl vinyl ether copolymer (PFA 500 LP, trade name, produced by Mitsui Fluorochemical Co., Ltd.) with a width of 20 mm and a thickness of 0.13 mm in the shape of U.

Then, the above porous substrate was placed in a mold previously coated at the necessary portions with a fluoride wax (Difloil #100, trade name, produced by Osaka Kinzoku Kogyo Co., Ltd.), and subjected to hot pressure bonding by heating at a temperature of 350° to 370° C. under a load of a planar pressure of 20 kg/cm$^2$ for about 30 minutes, annealing at 80° to 90° C. for about one hour, and removal from the mold to complete the end portion sealing. The end portion seal thus obtained was found to be uniform at the end surface, and there was no gas leakage whatsoever from this portion.

EXAMPLE 4

A mixture of 192 g of a powdery tetrafluoroethylene-perfluoroalkyl vinyl ether copolymer (Teflon HP-20, trade name, produced by Mitsui Fluorochemical Co., Ltd.) and 128 g of a fluoride type solvent (Fluorad FC 721, trade name, Sumitomo 3M Co., Ltd.) was stirred at room temperature for 30 minutes to prepare a mixed agent for coating.

Then, a porous plate substrate made of thin graphite fibers which was a carbon paper with a size of 700 mm×700 mm and a thickness of 2 mm (E-750, trade name, produced by Kureha Kagaku Co., Ltd.) was coated at both end portions with the above mixed agent to widths each of 20 mm and left to stand for air drying, which step was followed by further coating with a film of a tetrafluoroethylene-perfluoroalkyl vinyl ether copolymer (PFA 500 LP, trade name, produced by Mitsui Fluorochemical Co., Ltd.) with a width of 30 mm and a thickness of 0.13 mm in the shape of U.

Separately, a fluoride oil was prepared by mixing 120 g of a fluoride wax (Difloil #100, trade name, produced by Osaka Kinzoku Kogyo Co., Ltd.) and 180 g of a fluoride solvent (Freon 113, trade name, produced by Mitsui Fluorochemical Co., Ltd.) under stirring at 45° to 50° C. for 30 minutes. The above porous substrate having the powdery and film copolymers dispersed or coated at the end portions as described above was placed in a mold, which had been previously coated with the fluoride oil, and subjected to hot pressure bonding under the same conditions as in Example 3 to form end portion seals.

From the end portion seals thus formed, there was no gas leakage whatsoever, the end surface being smooth. Particularly, no deterioration was detected in a cell prepared by lamination of the electricity generating elements containing the electrodes obtained by the use of this seal after operation at a high temperature for long time. The result was also similar with respect to electrical insulation.

EXAMPLE 5

To 40 parts by weight of a tetrafluoroethylene-perfluoroalkyl vinyl ether copolymer (Teflon MP-20, trade name, produced by Mitsui Fluorochemical Co., Ltd.) were added 100 parts by weight of water and 3 parts of a nonionic surfactant (Triton X-100, trade name, produced by Rohm & Haas Japan Co., Ltd.), and the mixture was vigorously stirred for dispersion of the above copolymer thereby to prepare an emulstion thereof.

As the next step, a porous plate substrate made of thin graphite fibers comprising a carbon paper with a size of 700 mm×700 mm and a thickness of 0.5 mm (E-715, trade name, produced by Kureha Kagaku Co., Ltd.) was coated at both end portions with the above emulsion to widths of 20 mm and dried.

Then, hot pressure bonding was carried out in a mold coated with a fluoride oil similarly as in Example 1. As a result, seal portions having good electrical insulation without gas leakage from the end surfaces were similarly obtained.

EXAMPLE 6

An emulsion of the tetrafluoroethylene-perfluoroalkyl vinyl ether copolymer was prepared in the same manner as in Example 5, and the thin carbon paper was coated with this emulsion and dried. This was further coated with a film of tetrafluoroethylene-perfluoroalkyl vinyl ether copolymer (PFA 500 LP, trade name, produced by Mitsui Fluorochemical Co., Ltd.) with a thickness of 0.13 mm in shape of U.

Following thereafter the same procedure as in Example 1, hot pressure bonding was carried out under the same conditions in a mold coated with the fluoride oil. As a result, sealed portions having excellent gas impermeability and electrical insulation property were formed.

EXAMPLE 7

A porous plate substrate of thin graphite fibers comprising a carbon paper with a size of 700 mm×700 mm and a thickness of 0.5 mm (E-715, trade name, produced by Kureha Kagaku Kogyo Co., Ltd.) was provided at the end portions to widths each of 20 mm with a film of a tetrafluoroethylene-perfluoroalkyl vinyl ether copolymer (PFA 500 LP, trade name, produced by Mitsui Fluorochemical Co., Ltd.) with a thickness of 0.13 mm which had been molded in the shape substantially corresponding to the end portion by softening in a mold heated at 220°–230° C.

Then, the mold surface of the hot pressure bonding tool was covered with an aluminum foil, and the above porous substrate was placed in a mold previously coated at the necessary portions with a fluoride wax (Difloil #100, trade name, produced by Osaka Kinzoku Kogyo Co., Ltd.), and subjected to hot pressure bonding by heating at a temperature of 350°–370° C. under a load of a planar pressure of 20 kg/cm$^2$ for about 30 minutes, annealing at 80°–90° C. for about one hour, and removal from the mold to complete the end portion sealing. The end portion seal thus obtained was found to be uniform at the end surface without any gas leakage.

EXAMPLE 8

A mixture of 192 g of a powdery tetrafluoroethylene-perfluoroalkyl vinyl ether copolymer (Teflon HP-20, trade name, produced by Mistui Fluorochemical Co., Ltd.) and 128 g of a fluoride type solvent (Fluorad FC 721, trade name, Sumitomo 3M Co., Ltd.) was stirred at room temperature for 30 minutes to prepare a mixed agent for coating.

Then, by using as the porous plate substrate a carbon paper with a size of 700 mm×700 mm and a thickness of 2 mm (E-750, trade name, produced by Kureha Kagaku Co., Ltd.) prepared by sheet making of graphite fibers, the substrate was coated at end portions with the above mixed agent to widths of 20 mm and dried in air and further provided with a film of a tetrafluoroethylene-perfluoroalkyl vinyl ether copolymer (PFA 500 LP, trade name, produced by Mitsui Fluorochemical Co., Ltd.) with a thickness of 0.13 mm which had previously been formed into a U-shape similarly as described in Example 7.

Separately, a fluoride oil was prepared by mixing 120 g of a fluoride wax (Difloil #100, trade name, produced by Osaka Kinzoku Kogyo) and 180 g of a fluorine solvent (Freon 113, trade name, produced by Mitsui Fluorochemical Co., Ltd.) under stirring at 45°–50° C. for 30 minutes. The above described porous substrate having the powdery and film copolymers dispersed or coated at the end portions as described above was placed in a mold, which had been previously coated with the fluoride oil, and subjected to hot pressure bonding under the same conditions as in Example 7 to form end portion seals.

From the end portion seals thus formed, there was no gas leakage whatsoever, the end surface being smooth. Particularly, no deterioration was detected in a cell prepared by lamination of the electricity generating elements containing the electrodes obtained by the use of this seal after operation at a high temperature for long time. The result was also similar with respect to electrical insulation.

EXAMPLE 9

To 40 parts by weight of a tetrafluoroethylene-perfluoroalkyl vinyl ether copolymer (Teflon MP-20, trade name, produced by Mitsui Fluorochemical Co., Ltd.) were added 100 parts by weight of water and 3 parts of a nonionic surfactant (Triton X-100, trade name, produced by Rohm & Haas Japan Co., Ltd.), and the mixture was vigorously stirred for dispersion of the above copolymer, to prepare an emulsion thereof.

As the next step, a porous plate substrate made of thin graphite fibers comprising a carbon paper with a size of 700 mm×700 mm and a thickness of 0.5 mm (E-715, trade name, produced by Kureha Kagaku Co., Ltd.) was coated at both end portions with the above emulsion to widths each of 20 mm and dried. Subsequently, a film of a tetrafluoroethylene-perfluoroalkyl vinyl ether copolymer (PFA 500 LP, trade name, produced by Mitsui Fluorochemical Co., Ltd.) with a thickness of 0.13 mm was formed into a U-shape similarly as described in Example 7, and the end portions of the above coated substrate were inserted thereinto.

Then, hot pressure bonding was carried out in a mold formed of Silumin, which is an aluminum alloy, coated with a fluoride oil similarly as in Example 7 under the same conditions. As a result, seal portions of excellent gas impermeability and electrical insulation property were obtained.

EXAMPLE 10

A mixture of 192 g of a tetrafluoroethylene-perfluoroalkyl vinyl ether copolymer (PFA copolymer) (Teflon MP-20, trade name, produced by Mistui Fluorochemical Co., Ltd.) and 128 g of a fluoride type solvent (Fluorad FC 721, trade name, Sumitomo 3M Co., Ltd.) was stirred at room temperature for 30 minutes to prepare a mixed agent for coating.

Then, a porous plate substrate made of thin graphite fibers comprising a carbon paper with a size of 700 mm×700 mm and a thickness of 0.5 mm (E-715, trade name, produced by Kureha Kagaku Co., Ltd.) was coated at both end portions with the above mixed agent to widths lack of 20 mm and left to stand for air drying to cause the above copolymer to be dispersed at said end portions.

Separately, a mold as shown in the drawings was previously coated at the necessary portions with a fluoride wax (Difloil #100, trade name, produced by Osaka Kinzoku Kogyo Co., Ltd.), and the porous substrate as prepared above was placed within the mold and heated at a temperature of 340°–370° C. under a load of a planar pressure of 20 kg/cm$^2$ for about 15 minutes, which step was followed by annealing at 80°–90° C. for about one hour. When the mold was removed, and the product was left to stand for air drying, the above copolymer was found to be pressurized into the substrate and the thermally fused portion of PFA copolymer formed, being attached with a rise of about 0.1 mm.

Having thus formed the thermally fused portions of PFA copolymer at the ends of the porous substrate, at the end portions on the surface on the opposite side to the gas feed channels, silicon carbide (SiC) powder (average particle size 0.5 microns, produced by Showa Denko Kabushiki Kaisha) was dispersed densely to a thickness of 0.1 mm, which was heated by a hot pressure bonding tool made of aluminum to 330° C., whereat it was pressure bonded under a planar pressure of 20 kg/cm$^2$ for 5 minutes.

The product was taken out from the tool, and its surface was observed. As a result, SiC was found to be secured on the end surfaces through fusion of PFA copolymer, and the surfaces subjected to this treatment exhibited wettability with respect to electrolytes such as phosphoric acid. Thus, end portion seals with reliability could be formed.

EXAMPLE 11

At the end portions on the surface opposite to the reaction gas feed channels of the thermally fused portions of PFA copolymer formed on the ends of the porous substrate similarly as in Example 10, a mixture of 100 parts by weight of SiC and 20 parts by weight of PFA copolymer powder (Teflon MP 10, produced by Mitsui Fluorochemical Co., Ltd.) was dispersed to a thickness of 0.2 mm and pressure bonded similarly as in Example 10. The face thus obtained exhibited wettability with respect to an electrolyte.

EXAMPLE 12

At the end portions on the surface opposite to the reaction gas feed channels of the thermally fused portions of PFA copolymer formed on the ends of the porous substrate similarly as in Example 10, a paste-like mixture prepared by kneading 100 parts by weight of SiC, 15 parts by weight of the PFA copolymer powder, 500 parts by weight of Diflon S3 (produced by Osaka Kinzoku Kogyo Co., Ltd.), which was a fluoride type dispersing medium, and 4 parts by weight of Difloil #100 (produced by Osaka Kinzoku Kogyo Co., Ltd.) was dispersed to a thickness of 0.2 mm and pressure bonded similarly as in Example 10.

The hot pressure bonded faces at the ends of the substrate thus obtained also exhibited wettability with respect to an electrolyte.

EXAMPLE 13

A porous plate substrate of thin graphite fibers comprising a carbon paper with a size of 700 mm×700 mm and a thickness of 0.5 mm (E-715, trade name, produced by Kureha Kagaku Kogyo Co., Ltd.) was fitted at the end portions to widths each of 20 mm with a film of a tetrafluoroethylene-perfluoroalkyl vinyl ether copolymer (PFA 500 LP, trade name, produced by Mitsui Fluorochemical Co., Ltd.) with a thickness of 0.13 mm which had been molded in a shape substantially corresponding to the end portion by softening in a mold heated at 220°–230° C.

Then, the mold surface of the hot pressure bonding tool was covered with an aluminum foil, and the above porous substrate was placed in a mold previously coated at the necessary portions with a fluoride wax (Difloil #100, trade name, produced by Osaka Kinzoku Kogyo Co., Ltd.) and subjected to hot pressure bonding by heating at a temperature of 350°–370° C. under a load of a planar pressure of 20 kg/cm$^2$ for about 30 minutes, annealing at 80°–90° C. for about one hour, and removal from the mold to complete the end portion sealing.

Having thus formed the thermally fused portions of PFA copolymer at the ends of the porous substrate, at the end portions on the surface on the opposite side to the gas feed channels, silicon carbide powder (average particle size 0.5 micron, produced by Showa Denko Co., Ltd.) was dispersed similarly as in Example 10, and heated by a hot pressure bonding tool made of aluminum to 330° C., whereat it was pressure bonded under a planar pressure of 20 kg/cm$^2$ for 5 minutes.

Also in this case, the end portion surface treated exhibited wettability with respect to an electrolyte, thus evidencing formation of an end portion seal with reliability.

In the above Examples 10 through 13, description has been set forth by referring particularly to the case of hot pressure bonding with silicon carbide (SiC). Alternatively, when other substances as described above, namely titanium carbide, tantalum carbide, tungsten carbide, zirconium oxide, tantalum oxide or carbon powder were used, it was found that good results similarly as in the above case of silicon carbide could be obtained.

Thus, when seals are formed at the end portions of a porous electrode substrate as shown in Examples 10 through 13, it is possible to obtain a very effective porous electrode, which can exhibit wettability with respect to an electrolyte, thus being capable of retaining an electrolyte without giving rise to leakage of reaction gases and without causing breakage or other troubles.

Regarding the commercially available fluoride oils or fluoride solvents used in these Examples, first the trade name Difloil of Osaka Kinzoku Kogyo Co., Ltd. is generally a polymer of trifluorochloroethylene

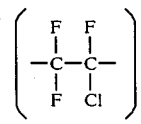

of a low polymerization degree, and exhibits an oily to waxy state depending on the polymerization degree. Difloil #100 is a wax having a polymerization degree corresponding to a number average molecular weight of 1300. Fluorad of Sumitomo 3M Co., Ltd. is a fluorocarbon type surfactant. Diflon S3 is a difluoro-type wax. Freon of Mitsui Fluorochemical Co., Ltd. is the general name for fluoride compounds having 1 to 4 carbon atoms to which fluoride atoms are bonded, as is well known in the art. Among them, Freon 113 has a molecular formula of $CCl_2\text{-}CClF_2$ and is frequently used because of its relatively high boiling point (47.6° C.) and also its high volatility.

What is claimed is:

1. A porous gas diffusion electrode constituted of an electroconductive porous substrate, which has itself on one surface reaction gas feed channels or is to be used with one surface in contact with reaction gas feed channels which comprises gas impermeable and electrically insulating seals formed from a material comprising a tetrafluoroethylene-perfluoroalkyl vinyl ether copolymer (PFA copolymer) and a substance wettable with respect to an electrolyte and thermally and chemically stable with respect to the electrolyte provided on the substrate at least at both end portions parallel to said reaction gas feed channels, wherein the substance wettable with respect to an electrolyte and thermally and chemically stable with respect to the electrolyte is used on the substrate at least at a hot pressure bonded portion formed from the PFA copolymer on the face opposite to the face having the reaction gas feed channels or the face opposite to the face to be contacted with the reaction gas feed channels during use.

2. A porous gas diffusion electrode constituted of an electroconductive porous substrate, which has itself on one surface reaction gas feed channels or is to be used with one surface in contact with reaction gas feed channels, which comprises gas impermeable and electrically insulating seals formed from a material comprising a tetrafluoroethylene-perfluoroalkyl vinyl ether copolymer (PFA copolymer) and a substance wettable with respect to an electrolyte and thermally and chemically stable with respect to the electrolyte provided on the substrate at least at both end portions parallel to said reaction gas feed channels, wherein the substance wettable with respect to an electrolyte and thermally and chemically stable with respect to the electrolyte is one or a combination of two or more of silicon carbide, titanium carbide, tantalum carbide, tungsten carbide, zirconium oxide, tantalum oxide and carbon powder.

3. A porous gas diffusion electrode constituted of an electroconductive porous substrate, which has itself on one surface reaction gas feed channels or is to be used with one surface in contact with reaction gas feed channels, which comprises gas impermeable and electrically insulating seals formed from a material comprising a tetrafluoroethylene-perfluoroalkyl vinyl ether copolymer (PFA copolymer) and a substance wettable with respect to an electrolyte and thermally and chemically stable with respect to the electrolyte, provided on the substrate at least at both end portions parallel to said reaction gas feed channels, wherein the substance wettable with respect to an electrolyte and thermally and chemically stable with respect to the electrolyte is used as the paste-like mixture with the PFA copolymer and a fluoride type dispersing medium.

4. A method of preparing a porous gas diffusion electrode constituted of an electroconductive porous substrate, which has itself on one surface reaction gas feed channels or is to be used with one surface in contact with reaction gas feed channels during use, which comprises applying a tetrafluoroethylene-perfluoroalkyl vinyl ether copolymer on the substrate at least at the end portions parallel to the reaction gas feed channels and then subjecting the substrate coated with the copolymer to hot pressure bonding by means of a pressure bonding tool made of a metal previously coated with a fluoride oil to form gas impermeable and electrically insulating seals.

5. A method according to claim 4 further comprising the steps of further applying after the hot pressure bonding of the PFA copolymer a substance wettable with respect to an electrolyte and thermally and chemically stable with respect to the electrolyte and hot pressure bonding by means of a pressure bonding tool made of aluminum or its alloy to form gas impermeable and electrically insulating seals.

6. A method according to claim 5, wherein the substance wettable with respect to an electrolyte and thermally and chemically stable with respect to the electrolyte is applied on the substrate at least at the hot pressure bonded portion formed from the PFA copolymer on the face opposite to the face having the reaction gas feed channels or the face opposite to the face to be contacted with the reaction gas feed channels during use.

7. A method according to claim 5, wherein the substance wettable with respect to an electrolyte and thermally and chemically stable with respect to the electrolyte is one or a combination of two or more of silicon carbide, titanium carbide, tantalum carbide, tungsten carbide, zirconium oxide, tantalum oxide and carbon powder.

8. A method according to claim 5, wherein the substance wettable with respect to an electrolyte and thermally and chemically stable with respect to the electrolyte is used as a mixture with the PFA copolymer.

9. A method according to claim 5, wherein the substance wettable with respect to an electrolyte and thermally and chemically stable with respect to the electrolyte is used as the paste-like mixture with the PFA copolymer and a fluorine type dispersing medium.

10. A method according to claim 4, wherein the PFA copolymer is subjected to hot pressure bonding at a temperature of 340° to 380° C.

11. A method according to claim 5, wherein the substance wettable with respect to an electrolyte and thermally and chemically stable with respect to the electrolyte is subjected to hot pressure bonding at a temperature of 300° to 370° C.

12. A method according to claim 5, wherein the PFA copolymer is subjected to hot pressure bonding at a temperature of 340° to 380° C.

13. A method according to claim 4, wherein the PFA copolymer in any of powdery, granular, film, and emulsion forms is used singly or in combination.

14. A method according to claim 13, wherein the PFA copolymer is molded by heating to correspond to the shape of the end portion of the substrate before use.

* * * * *